(12) United States Patent
Blouch

(10) Patent No.: US 6,553,841 B1
(45) Date of Patent: Apr. 29, 2003

(54) PRESSURE TRANSDUCER ASSEMBLY

(75) Inventor: Stephen C. Blouch, Boulder, CO (US)

(73) Assignee: Helix Technology Corporation, Mansfield, MA (US)

( * ) Notice: Subject to any disclaimer, the term of this patent is extended or adjusted under 35 U.S.C. 154(b) by 80 days.

(21) Appl. No.: 09/669,930

(22) Filed: Sep. 26, 2000

(51) Int. Cl.⁷ .............................................. G01L 21/12
(52) U.S. Cl. .............................. 73/755; 73/700; 73/753
(58) Field of Search ......................... 73/755, 146, 700, 73/715, 756, 753, 754; 339/126, 94; 29/854, 855, 856, 868

(56) References Cited

U.S. PATENT DOCUMENTS

| | | | |
|---|---|---|---|
| 3,153,295 A | 10/1964 | Allyn | 42/75 |
| 3,512,249 A | 5/1970 | Lewis | 29/588 |
| 3,846,823 A | 11/1974 | Matthews et al. | 357/74 |
| 3,997,232 A | 12/1976 | Dunaway | 339/94 |
| 4,281,887 A | 8/1981 | Luca, Jr. | 339/103 |
| 4,352,240 A | 10/1982 | Komada | 29/854 |
| 4,364,623 A * | 12/1982 | Hammill | 339/126 |
| 4,383,355 A | 5/1983 | Eisele | 29/588 |
| 4,524,497 A | 6/1985 | Rapps et al. | 29/25.35 |
| 4,647,122 A | 3/1987 | Kelly | 339/14 |
| 4,691,418 A | 9/1987 | Ingle et al. | 29/25.35 |
| 4,937,936 A * | 7/1990 | Schill et al. | 29/854 |
| 5,218,751 A | 6/1993 | Chen et al. | 29/621 |

* cited by examiner

Primary Examiner—Hezron Williams
Assistant Examiner—Alandra N. Ellington
(74) Attorney, Agent, or Firm—Hamilton, Brook, Smith & Reynolds, P.C.

(57) ABSTRACT

A pressure transducer assembly includes a transducer member supporting a transducer element for measuring pressure within an environment. The transducer member has a sealing surface surrounding the transducer element. A housing having an integral resilient member resiliently supports the transducer member and exerts a sealing force on the transducer member against a mating member secured to the housing.

27 Claims, 3 Drawing Sheets

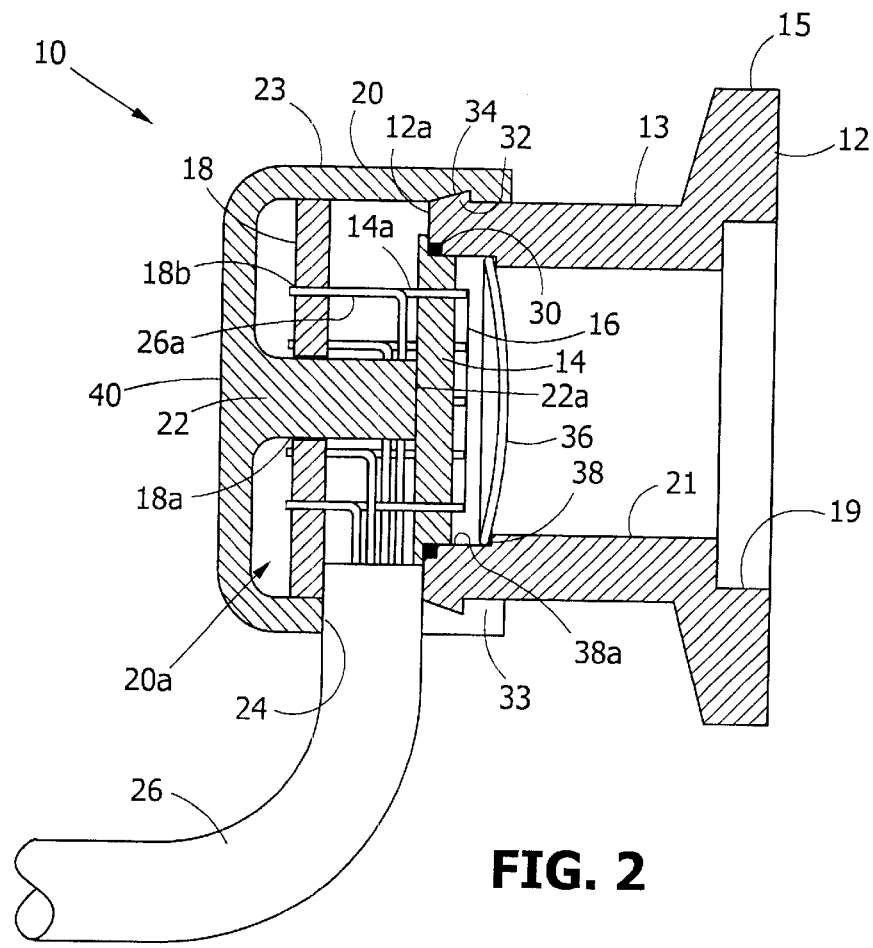
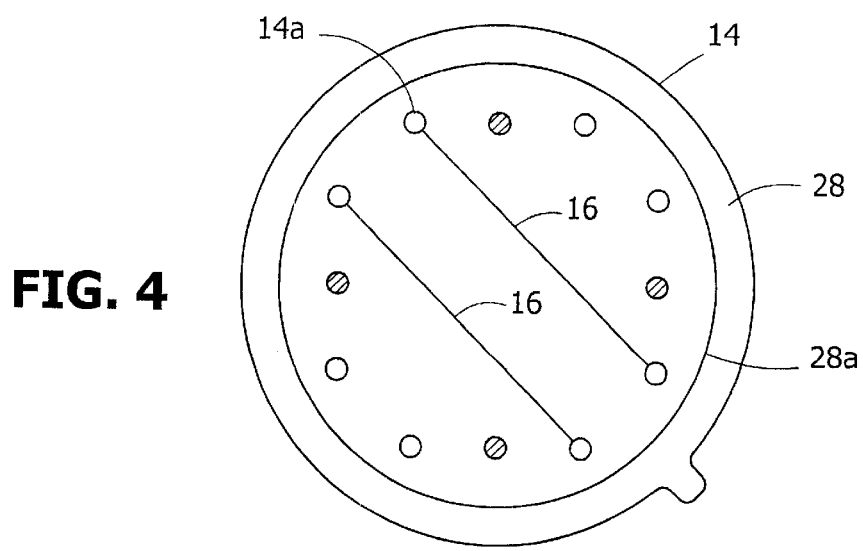

PRESSURE TRANSDUCER ASSEMBLY

BACKGROUND

Pressure transducers, for example a Pirani gauge or equivalent, are commonly used to measure gas pressure within enclosed environments (for example, processing chambers, areas between the pump and the process chamber, or load locks). Typically, the pressure transducer is contained within a housing that is positioned externally relative to the enclosure or chamber surrounding the environment. The pressure transducer housing is in communication with the enclosure by a conduit sealed therebetween. Consequently, the environment within the enclosure is extended to the pressure transducer via the conduit. The connecting conduit usually consists of a first fitting, secured to the pressure transducer housing, and a mating second fitting connected to the enclosure. Common methods of forming a gas tight seal between the pressure transducer housing and the fitting secured thereto include welding, soldering, brazing, bolting and the use of adhesives. Most of these methods require trained or skilled labor, as well as the use of tools for assembly.

SUMMARY

The present invention provides a transducer assembly where a gas tight seal can be formed against a fitting without employing skilled labor or the use of tools. The transducer assembly includes a transducer member supporting a transducer element for measuring properties of an environment. The transducer member has a sealing surface surrounding the transducer element. A housing is included which has an integral resilient member for resiliently supporting the transducer member and for exerting a sealing force on the transducer member against a mating member secured to the housing.

In preferred embodiments, the transducer assembly is a pressure transducer assembly for measuring pressure. The transducer assembly further includes the mating member which consists of a fitting having a circular cavity therethrough for sealing against the sealing surface of the transducer member and for surrounding the transducer element. The fitting facilitates coupling of the transducer assembly to the environment. A locking arrangement on the housing locks the fitting to the housing. The locking arrangement includes an angled circular groove formed in the housing near the opening of the housing for engaging an angled circular locking flange extending from the fitting. A filter element is positioned within the fitting for protecting the transducer element from contaminants. The housing has an interior with a circular opening thereto and a resilient rear wall forming the resilient member. A protrusion extends from the resilient rear wall towards the opening of the housing and into contact with the transducer member for exerting the sealing force on the transducer member in an axial direction. The transducer member includes a rigid circular plate having first and second sides. The transducer element and an annular flange forming at least a portion of the sealing surface, extend along the first side of the plate. An "O" ring is positioned on the annular flange to provide further sealing between the transducer member and the fitting. A circuit board facing the second side of the plate is electrically connected to the transducer element. The circuit board has an opening therethrough so that the protrusion from the resilient rear wall is able to extend through the opening before contacting the rigid circular plate.

The present invention allows a fitting to be sealed to a pressure transducer member in a gas tight manner merely by pushing the fitting by hand into the opening of the housing which surrounds the pressure transducer member until the fitting locks to the housing. This saves labor and time during assembly which results in cost benefits as well as flexibility for inventory. For example, the pressure transducer assembly may be offered with a choice of fittings. The customer is able to request a particular fitting which is secured to the housing prior to shipment. Alternatively, since the assembly procedure is simple and easily conducted, this can also be performed by the customer.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 2 is a side sectional view of the pressure transducer assembly depicted in FIG. 1.

FIG. 4 is a top view of the pressure transducer plate depicting the transducer element wires.

DETAILED DESCRIPTION OF THE INVENTION

Figure 1:
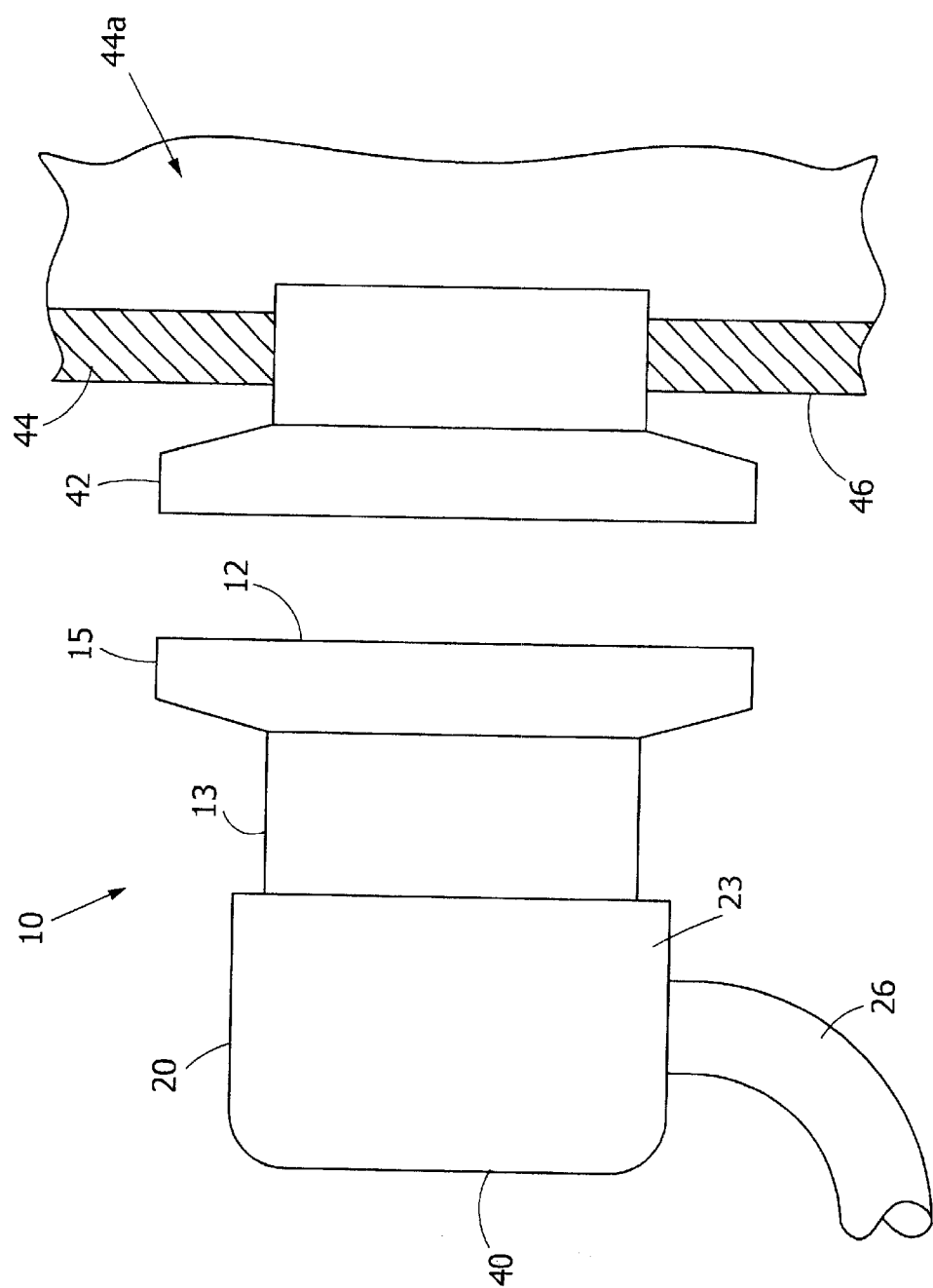
FIG. 1 is a side view of an embodiment of the present invention pressure transducer assembly positioned for securement to an enclosure.

Referring to FIG. 1, pressure transducer assembly 10 includes a housing 20 containing a pressure transducer plate 14 (FIG. 4) having pressure transducer elements 16 for measuring gas pressure within an enclosed environment, such as the interior 44a of an enclosure 44 (for example, a process chamber, areas between the pump and the chamber, or a load lock). A fitting, for example fitting 12, is secured to housing 20 and sealed against transducer plate 14 around pressure transducer elements 16. Fitting 12 is engaged with a mating fitting, for example fitting 42, which is secured to the wall 46 of the enclosure 44 and is in communication with the interior 44a thereof. Typical methods of engaging fitting 12 with fitting 42 include clamping with an external annular shaped clamp or with bolts. Alternative methods include the use of threaded fittings. Pressure transducer elements 16 preferably consist of two resistive wires (FIG. 4) which extend above the surface of pressure transducer plate 14. The wires of pressure transducer elements 16 are connected to a circuit contained within a circuit board 18 (FIG. 2). Typically, one wire is heated relative to the other wire. The unheated wire is connected in series with a temperature compensating resistor which is not exposed to the measured environment. The current through the heated wire is controlled such that the resistance of the heated wire is equal to the combined resistance of the unheated wire and the temperature compensating resistor. The current and voltage passing through the heated wire is measured and correlated to the appropriate pressure of the measured environment. Pressure transducer elements 16 operate in a manner similar to that described in U.S. patent application Ser. No. 09/583,339, filed May 31, 2000, which describes Pirani type and related gauges, the contents of which is incorporated herein in its entirety by reference.

Figure 3:
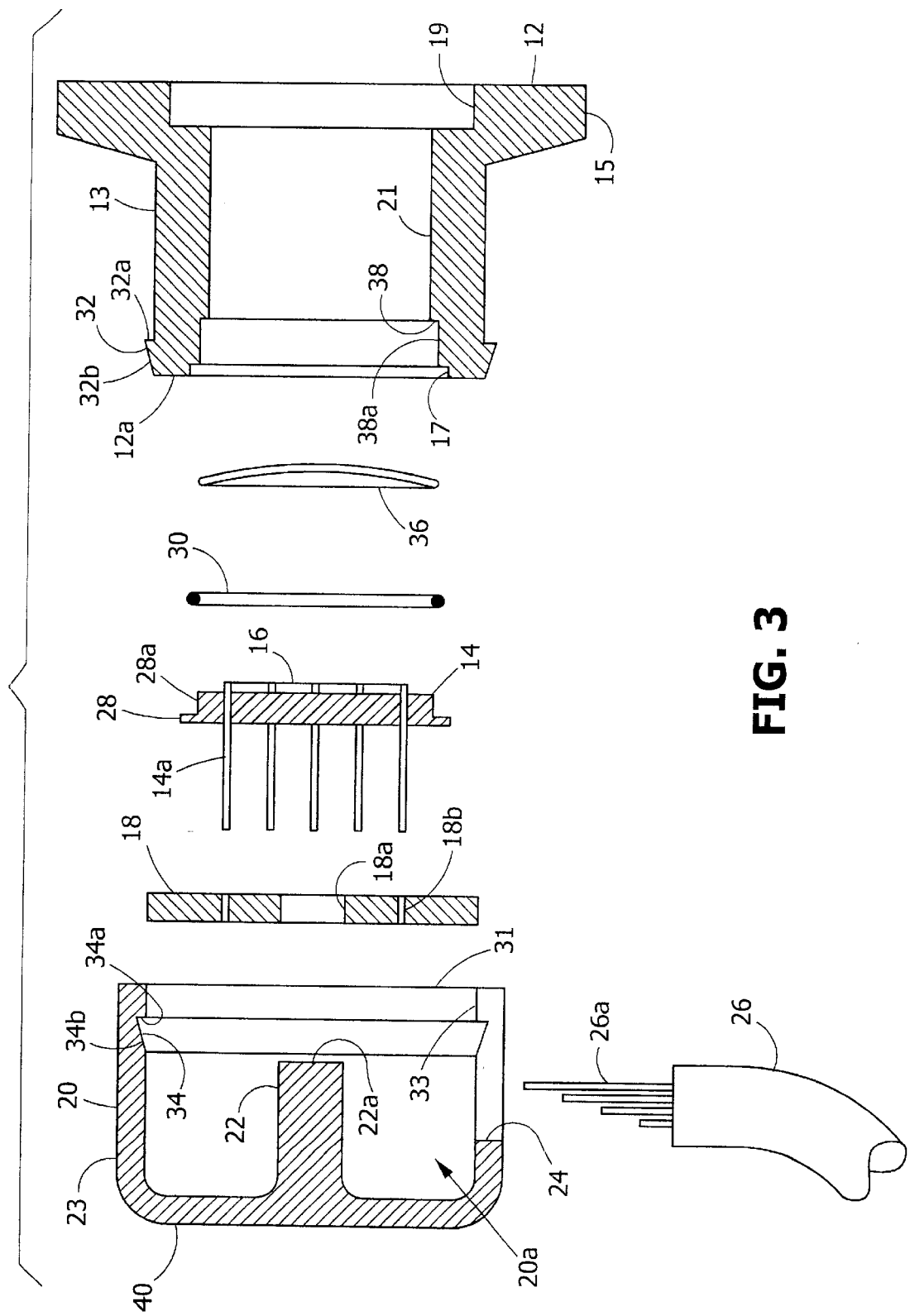
FIG. 3 is a side sectional exploded view of the pressure transducer assembly depicted in FIG. 1.

Referring to FIGS. 2–4, the pressure transducer elements 16 of pressure transducer plate 14 are electrically connected to circuit board 18 by a series of pins 14a extending therebetween (FIGS. 2 and 3). Both the pressure transducer plate 14 and circuit board 18 are circular in shape and are housed within the interior 20a of housing 20. Housing 20 has a circular cup shape and is formed of resilient material. A cable 26 extends through an opening 24 within the circular side wall 23 of housing 20 and is electrically connected to circuit board 18 by leads 26a. Housing 20 includes a deflectable resilient rear wall 40 with a circular post 22 extending from the center of rear wall. Post 22 extends through an opening 18a within circuit board 18 to contact the rear surface of pressure transducer plate 14. Pressure transducer plate 14 is sealed to fitting 12, which facilitates coupling to enclosure 44 for pressure. Fitting 12 has an external angled annular flange 32 which engages or snaps into an internal angled annular groove 34 in the housing 20 near the opening 31 for locking fitting 12 to housing 20. The resilient rear wall 40 behaves as a spring and exerts a sealing force on pressure transducer plate 14 thereby forcing pressure transducer plate 14 against fitting 12 for sealing therebetween. An "O" ring 30 is positioned between fitting 12 and pressure transducer plate 14 to improve sealing and ensure that the seal is gas tight.

During assembly, circuit board 18, cable 26 and pressure transducer plate 14 are first preassembled together. Cable 26 is perpendicular to circuit board 18, so that the leads 26a are cut at staggered lengths (FIG. 3) and then bent at right angles (FIG. 2) before soldering within corresponding holes 18b of circuit board 18. The pins 14a of transducer elements 16 extending from pressure transducer plate 14 are also soldered into corresponding holes 18b of circuit board 18. Pressure transducer plate 14 is spaced apart from circuit board 18 so that leads 26a are positioned therebetween. The "O" ring 30 is slid over diameter 28a of pressure transducer plate 14 and positioned on the annular flange 28 (FIG. 3) which extends around the perimeter of plate 14. The circuit board 18/cable 26/pressure transducer plate 14 preassembly is then inserted into housing 20. The circuit board 18 is slid over post 22 through opening 18a (FIGS. 2 and 3) in circuit board 18 and cable 26 is slid into housing 20 through the opening 24 in the side wall 23. The preassembly is advanced into the housing 20 until pressure transducer plate 14 abuts against the flat end 22a of post 22.

Pressure transducer assembly 10 may be kept in stock at the manufacturing plant or distributor's warehouse without fitting 12 assembled thereto to provide flexibility in meeting customer's needs. For example, fitting 12 is one of the many different fittings which may be assembled with housing 20 before shipping to the customer. The reason for this is that there are many different types of mating fittings which are commonly secured to enclosed environments. Therefore, prior to shipping, the manufacturer (or distributor) may secure the particular type of fitting requested by the customer (for example fitting 12) to the housing 20. Alternatively, the customer can perform the assembly task.

Engagement of the fitting, for example, fitting 12, with housing 20 is easily and quickly performed without tools or skilled labor. A filter screen 36 for protecting transducer elements 16 from contaminants is first inserted into the bore 21 of fitting 12 against shoulder 38 of counterbore 38a (FIGS. 2 and 3). Next, the end 12a of fitting 12 is inserted by hand into the opening 31 of housing 20. The outwardly angled surface of the external annular flange 32 of fitting 12 progressively expands portion 33 of the resilient housing 20 outwardly, thereby allowing the passage of flange 32 therethrough. As the flange 32 passes through portion 33, the end 12a of fitting 12 engages pressure transducer plate 14, pushing plate 14 against post 22 backwardly and causing rear wall 40 to bow or deflect backwardly or outwardly in a curved manner. The central area of rear wall 40 experiences the greatest amount of deflection while the perimeter of rear wall 40 near the side wall 23 experiences the least amount of deflection. Deflection of rear wall 40 provides an axial sealing force between fitting 12 and pressure transducer plate 14. Axial forces exerted by the outward deflection of rear wall 40 are transferred by post 22 to pressure transducer plate 14 which in turn presses against fitting 12. Consequently, pressure transducer plate 14 is resiliently supported by the rear wall 40 of housing 20 via post 22. After passing portion 33, the external angled annular flange 32 of fitting 12 enters the internal annular angled groove 34 which is shaped to mate with flange 32 and snaps in place. The angled portions 34b/32b of groove 34 and flange 32 angle inwardly moving towards rear wall 40. Vertical shoulder 32a of flange 32 abuts the vertical shoulder 34a of groove 34 and prevents the flange 32 from being pushed out of groove 34 by the sealing force provided by rear wall 40. The resilient nature of housing 20 allows portion 33 to spring back to resume its original size and shape after flange 32 passes therethrough.

Once fitting 12 is locked to housing 20, a constant axial sealing force is maintained between fitting 12 and pressure transducer plate 14. The end 12a of fitting 12 presses axially against annular flange 28 of pressure transducer plate 14 and the counterbore 38a of fitting 12 radially engages diameter 28a (FIG. 3). The end 12a of fitting 12 includes a counterbore 17 for engaging and trapping "O" ring 30 between both annular flange 28 and diameter 28a of pressure transducer plate 14. The depth of counterbore 17 is slightly less than the width of "O" ring 30 which allows the "O" ring 30 to compress under the axial sealing force and provides axial sealing between annular flange 28 and the end 12a of fitting 12. Axial compression of "O" ring 30 also makes the "O" ring 30 widen or flatten and thereby presses the inner surface of "O" ring 30 radially inwardly against diameter 28a to provide radial sealing between counterbore 17 of fitting 12 and diameter 28a of pressure transducer plate 14. The mating sealing surfaces of pressure transducer plate 14 and fitting 12 along with "O" ring 30 provide a gas tight seal between the plate 14 and fitting 12 which encircles pressure transducer elements 16. Not only is the end 12a of fitting 12 tightly pressed against annular flange 28 of pressure transducer plate 14, but "O" ring 30 is compressed against both the annular flange 28 and diameter 28a thereby providing annular sealing over a perpendicular region. Since the pressure transducer plate 14 is formed of rigid material, the sealing surfaces of plate 14 remain stable, thereby providing reliable or consistent sealing.

The pressure transducer assembly 10 depicted in FIGS. 1–3 is typically connected to an enclosed environment, such as enclosure 44, in the following manner. Fitting 12 includes an external annular flange 15 which enables fitting 12 to be clamped to a mating fitting such as fitting 42 which is in communication with the interior 44a of enclosure 44 (FIG. 1). The mating fitting 42 is commonly mounted directly to the enclosure 44, but alternatively, may be connected by a hose or tubing. A counterbore 19 allows clearance for an "O" ring which is included with the mating fitting 42. Once fitting 12 is coupled to the mating fitting 42, pressure transducer elements 16 are in communication with the interior 44a of enclosure 44 by way of fittings 12 and 42, which form a conduit to the enclosed environment.

Consequently, the enclosed environment is extended by this conduit from the enclosure 44 to the pressure transducer plate 14 thereby positioning the pressure transducer elements 16 in the same conditions as within the enclosure 44. This enables the pressure transducer elements 16 to accurately measure the pressure within the enclosure while being positioned remotely relative to the enclosure 44. Since the fitting 12 is sealed to the pressure transducer plate 14, it can be seen that the region behind plate 14 within the interior 20a of housing 20 is external to the conditions surrounding transducer elements 16. It is understood that fitting 12 is just one of many different fittings that can be assembled to pressure transducer assembly 10. The particular fitting for engagement with pressure transducer assembly 10 is determined by the mating fitting (such as fitting 42) attached to the enclosure 44. Typically, in most cases, any differences between fittings occurs at the end which engages the mating fitting. Therefore, it is apparent that different configurations and methods of securing the two mating fittings together are common. Although a fitting, for example, fitting 12, has been described to be part of pressure transducer assembly 10, pressure transducer assembly 10 in particular circumstances may be considered complete without such a fitting.

In one embodiment of pressure transducer assembly 10, housing 20 is formed of a resilient polymer such as delrin and is about 0.875 inches in diameter and 0.55 inches wide. The wall thickness of housing 20 is about 0.05–0.06 inches thick and post 22 is about 0.2 inches in diameter. Post 22 extends to a position just below groove 34, about 0.18 inches below opening 31. Diameter portion 33 is about 0.757 inches in diameter. Groove 34 begins about 0.072 inches from the opening 31 and is 0.8 inches in diameter at that point. Groove 34 angles inwardly moving toward rear wall 40 at about a 17 degree angle. Opening 24 in sidewall 23 is about 0.2 inches wide and is sized to pinch cable 26 so that any pulling on cable 26 does not pull leads 26a from circuit board 18. Rear wall 40 provides about 2.5 lbs. of sealing force for about 0.025–0.030 inches of deflection.

The pressure transducer plate 14 in this embodiment is about 0.6 inches in diameter and 0.06 inches thick. Flange 28 is about 0.037 inches wide and 0.015 inches thick. Transducer plate 14 is rigid such that virtually all the sealing force for sealing fitting 12 to transducer plate 14 is provided by the resilient rear wall 40 of housing 20. Transducer plate 14 is formed of gold plated Kovar and has 12 pins 14a extending therefrom such as that used in integrated circuit packaging and available from Reeves-Hoffman (a division of the Dynamics Corporation of America). A portion of the pins 14a extend above the surface of transducer plate 14 on the side facing fitting 12. Referring to FIG. 4, the wires of pressure transducer elements 16 are each supported by a pair of pins 14a above transducer plate 14 and face fitting 12 as shown. The resistive wires are about 0.0005 inches in diameter and 0.425 inches long. The unused pins 14a which extend to circuit board 18 may be employed for providing support for circuit board 18.

In this embodiment, the outer diameter 13 of fitting 12 is about 0.75 inches in diameter with flange 15 being about 1.18 inches in diameter. When engaged, the combined axial length of housing 20 and fitting 12 is about 1.06 inches long. Angled flange 32 has an outer diameter of 0.797 inches resulting in a clearance of about 0.003 inches with groove 34. Flange 32 is about 0.078 inches long in the axial direction and is angled outwardly at about 17 degrees starting at end 12a. Counterbore 17 is about 0.585 inches in diameter and 0.024 inches deep. Counterbore 38 is about 0.53 inches in diameter and 0.135 inches deep. Bore 21 is about 0.42 inches in diameter. Fitting 12 is preferably formed of metal, such as aluminum.

While this invention has been particularly shown and described with references to preferred embodiments thereof, it will be understood by those skilled in the art that various changes in form and details may be made therein without departing from the scope of the invention encompassed by the appended claims.

For example, although particular dimensions and materials have been described for housing 20, pressure transducer plate 14 and fitting 12, such dimensions and materials may vary depending upon the application at hand. Housing 20 may be formed from more than one piece, may have metallic or composite parts, and may be formed of suitable polymers other than delrin. In addition, fitting 12 may be formed of other suitable metals such as brass, bronze or stainless steel, or may be formed of a polymer or composite material. Although flange 32 and groove 34 have been shown to be angled and engage on the interior of housing 20, alternatively, flange 32 and groove 34 may have curved or square surfaces and engage on the exterior of housing 20. In such a case, the fitting 12 and housing 20 are configured appropriately. Also, other suitable locking configurations may be employed such as threaded members, etc. The material of housing 20, the thickness and diameter of rear wall 40, the position of the flat end 22a of post 22 relative to groove 34, and the thickness of flange 28 of pressure transducer plate 14 may be controlled to provide different sealing forces as required. Although rear wall 40 has been described to provide all the sealing force, alternatively, plate 14 may be configured to provide some or all the sealing force. The sealing force may be provided by other means such as with resilient tabs, a resilient intermediate annular wall, or a centrally located spring such as a coil spring. The spring may be a separate component or integrally formed with the housing. The particular "O" ring sealing configuration depicted in FIGS. 2 and 3 may be varied to suit the situation at hand. For example, "O" ring 30 may be arranged to seal between flange 28 and the end 12a of fitting without radially engaging diameter 28a. Although pressure transducer assembly 10 has been shown to include a circuit board 18 positioned apart from pressure transducer plate 14, alternatively, circuit board 18 may be omitted, with circuitry being positioned on the back side of plate 14. In such a case, leads 26a of cable 26 would be connected to the back side of plate 14. Although pressure transducer assembly 10 is typically connected to an enclosed environment, alternatively, pressure transducer 10 may be physically positioned within the environment to be measured. Also, although particular pressure transducer elements 16 have been described above, other suitable pressure transducer elements may be employed. Finally, the present invention may provide a sealed arrangement for transducer elements other than pressure transducer elements, or for other electronic elements or devices such as light emitting devices.

What is claimed is:

1. A transducer assembly comprising:
 a transducer member supporting a transducer element for measuring properties of an environment, the transducer member having a sealing surface surrounding the transducer element;
 a housing having an integral resilient member for resiliently supporting the transducer member and for exerting a sealing force on the transducer member against a mating member secured To the housing, the mating, member comprising a fitting having a cavity therethrough for sealing against the sealing surface of the traducer member and for surrounding the transducer element, the resilient member comprising a resilient rear wall of the housing, the housing having an interior with an opening thereto, the housing also having a protrusion extending from the resilient rear wall towards the opening of the housing and into contact with the transducer member; and a locking arrangement on the housing for locking the fitting to the housing, the fitting facilitating coupling of the transducer assembly to said environment.

2. The transducer assembly of claim 1 in which the locking arrangement comprises an angled groove formed in the housing near the opening of the housing for engaging an angled locking flange from the fitting.

3. The transducer assembly of claim 2 in which the opening of the housing, the angled groove of the housing, the cavity of the fitting, and the angled locking flange of the fitting, are circular.

4. The transducer assembly of claim 3 in which the transducer member comprises:

a rigid circular plate having first and second sides, the transducer element and an annular flange forming at least a portion of the sealing surface extending along the first side of the plate; and a circuit board electrically connected to the transducer element and positioned facing the second side of the plate, the circuit board having an opening through which the protrusion from the resilient rear wall extends before contacting the rigid circular plate.

5. The transducer assembly of claim 4 further comprising an "O" ring positioned on the annular flange of the rigid circular plate.

6. The transducer assembly of claim 1 further comprising a filter element positioned within the fitting for protecting the transducer element from contaminants.

7. The transducer assembly of claim 1 in which the transducer element measures pressure.

8. A pressure transducer assembly comprising:

a transducer member supporting pressure transducer elements comprising two wires for measuring pressure within an environment, the transducer member having a sealing surface surrounding the pressure transducer elements;

a fitting having a cavity therethrough for sealing against the sealing surface of the transducer member and for surrounding the pressure transducer elements, the fitting facilitating coupling of the transducer assembly to said environment;

a housing having an interior with an opening thereto and a resilient rear wall, a protrusion extending from the resilient rear wall towards the opening of the housing and into contact with the transducer member for resiliently supporting the transducer member and for exerting a sealing force for sealing the fitting against the sealing surface; and a locking arrangement on the housing for locking the fitting to the housing.

9. The transducer assembly of claim 8 in which the locking arrangement comprises an angled groove formed in the housing near the opening of the housing for engaging an angled locking flange extending from the fitting.

10. The transducer assembly of claim 9 in which the opening of the housing, the angled groove of the housing, the cavity of the fitting, and the angled locking flange of the fitting, are circular.

11. The transducer of claim 10 in which the transducer member comprises:

a rigid circular plate having first and second sides, the pressure transducer elements and an annular flange forming at least a portion of the sealing surface extending along the first side of the plate; and a circuit board electrically connected to the pressure transducer elements and positioned facing the second side of the plate, the circuit board having an opening through which the protrusion from the resilient rear wall extends before contacting the rigid circular plate.

12. The transducer assembly of claim 11 further comprising an "O" ring positioned on the annular flange of the rigid circular plate.

13. The transducer assembly of claim 8 further comprising a filter element positioned within the fitting for protecting the pressure transducer elements from contaminants.

14. A pressure transducer assembly comprising:

a transducer member having a pressure Transducer element for measuring pressure within an environment, the transducer member having a sealing surface surrounding the pressure transducer element;

a fitting having a cavity therethrough for sealing against the sealing surface of the transducer member and for surrounding the pressure transducer element, the fitting facilitating coupling of the transducer assembly to said environment;

a housing for housing the transducer member having an interior with an opening thereto;

a locking arrangement on the housing for locking the fitting to the housing, the locking arrangement comparing an angled groove formed in The housing near the opening of the housing for engaging an angled locking flange extending from the fitting; and a resilient member for exerting a sealing force on the transducer member for sealing the fitting against the sealing surface, the resilient member comprising a resilient rear wall of the housing, the housing having an interior with an opening thereto, the housing also having a protrusion extending from the resilient rear wall towards the opening of the housing and into contact with the transducer member.

15. A method of forming a transducer assembly comprising the steps of:

providing a transducer member supporting a transducer element for measuring properties of an environment, the transducer member having a sealing surface surrounding the transducer element;

providing a housing having an integral resilient member for resiliently supporting the transducer member and for exerting a sealing force on the transducer member against a mating member secured to the housing, the mating member comprising a fitting having a cavity therethrough for sealing against the sealing surface of the transducer member and for surrounding the transducer element, the resilient member comprising a resilient rear wall of the housing, the housing having an interior with an opening thereto, the housing also having a protrusion extending from the resilient rear wall towards the opening of the housing and into contact with the transducer member; and providing a locking arrangement on the housing for locking the fining to the housing, the fitting facilitating coupling of the transducer assembly to said environment.

16. The method of claim 15 further comprising the step of forming an angled groove in the housing near the opening of the housing to form the locking arrangement, an angled locking flange extending from the fitting for engaging the angled groove.

17. The method of claim 16 further comprising the step of forming the opening of the housing, the angled groove of the housing, the cavity of the fitting, and the angled locking flange of the fitting, to be circular.

18. The method of claim 17 further comprising the step of:
providing the transducer member with a rigid circular plate having first and second sides, the transducer element and an annular flange forming at least a portion of the sealing surface extending along the first side of the plate; and
electrically connecting a circuit board to the transducer element, the circuit board being positioned facing the second side of the plate, the circuit board having an opening through which the protrusion from the resilient rear wall extends before contacting the rigid circular plate.

19. The method of claim 18 further comprising the step of positioning an "O" ring on the annular flange of the rigid circular plate.

20. The method of claim 15 further comprising the step of positioning a filter element within the fitting for protecting the transducer element from contaminants.

21. The method of claim 15 further comprising the step of providing the transducer member with a pressure transducer element for measuring pressure in said environment.

22. A method of forming a pressure transducer assembly comprising the steps of:
providing a transducer member supporting pressure transducer elements comprising two wires for measuring pressure within an environment, the transducer member having a sealing surface surrounding the pressure transducer elements;
providing a fitting having a cavity therethrough for sealing against the sealing surface of the transducer member and for surrounding the pressure transducer elements, the fitting facilitating coupling of the transducer assembly to said environment;
providing a housing having an interior with an opening thereto and a resilient rear wall, a protrusion extending from the resilient rear wall towards the opening of the housing and into contact with the transducer member for resiliently supporting the transducer member and for exerting a sealing force for sealing the fitting against the sealing surface; and
providing a locking arrangement on the housing for locking the fitting to the housing.

23. The method of claim 22 further comprising the step of forming an angled groove in the housing near the opening of the housing to form the locking arrangement, an angled locking flange extending from the fitting for engaging the angled groove.

24. The method of claim 23 further comprising the step of forming the opening of the housing, the angled groove of the housing, the cavity of the fitting, and the angled locking flange of the fitting, to be circular.

25. The method of claim of claim 24 further comprising the step of:
providing the transducer member with a rigid circular plate having first and second sides, the pressure transducer elements and an annular flange forming at least a portion of the sealing surface extending along the first side of the plate; and
electrically connecting a circuit board to the pressure transducer elements, the circuit board being positioned facing the second side of the plate, the circuit board having an opening through which the protrusion from the resilient rear wall extends before contacting the rigid circular plate.

26. The method of claim 24 further comprising the step of positioning an "O" ring on the annular flange of the rigid circular plate.

27. The method of claim 22 further comprising the step of positioning a filter element within the fitting for protecting the pressure transducer elements from contaminants.

* * * * *